United States Patent [19]

Williams

[11] Patent Number: 5,371,548

[45] Date of Patent: Dec. 6, 1994

[54] SYSTEM FOR TRANSMISSION OF DIGITAL DATA USING ORTHOGONAL FREQUENCY DIVISION MULTIPLEXING

[75] Inventor: Thomas H. Williams, Longmont, Colo.

[73] Assignee: Cable Television Laboratories, Inc., Boulder, Colo.

[21] Appl. No.: 89,120

[22] Filed: Jul. 9, 1993

[51] Int. Cl.$^5$ .................. H04N 7/087; H04N 7/08
[52] U.S. Cl. ...................... 348/478; 348/473
[58] Field of Search .............. 358/142, 147, 143, 144, 358/145; 348/460, 461, 465, 466, 473, 474, 476, 477, 478, 479, 480, 481; 370/23; H04N 7/08, 7/087

[56] References Cited

U.S. PATENT DOCUMENTS

| | | | |
|---|---|---|---|
| 3,511,936 | 5/1970 | Saltzberg | 179/15 |
| 4,882,614 | 11/1989 | Kageyama et al. | 358/141 |
| 4,884,139 | 11/1989 | Pommier | 348/484 |
| 5,153,723 | 10/1992 | Citta | 348/484 |
| 5,291,289 | 3/1994 | Hulyalkar et al. | 348/469 |

FOREIGN PATENT DOCUMENTS

| | | | |
|---|---|---|---|
| 402992 | 12/1990 | European Pat. Off. | H04N 7/087 |
| 0466500A2 | 12/1991 | European Pat. Off. | |
| 222390 | 10/1986 | Japan | H04N 7/08 |
| 97084 | 4/1989 | Japan | H04N 7/08 |
| 122782 | 5/1990 | Japan | H04N 7/08 |
| 156787 | 6/1990 | Japan | H04N 7/08 |
| 166982 | 6/1990 | Japan | H04N 7/08 |
| 274687 | 9/1992 | Japan | H04N 7/08 |

OTHER PUBLICATIONS

Gledhill, et al., "The Transmission of Digital Television in the UHF Bank Using Orthogonal Frequency Division Multiplexing", Nat'l Transcommunications Ltd. UK, pp. 175–180.

Lassalle, R & Alard, M., "Principles of Modulation and Channel Coding for Digital Broadcasting for Mobile Receivers":, EBU Review-Technical, No. 224–Aug. 1987, pp. 168–190.

*Primary Examiner*—James J. Groody
*Assistant Examiner*—Chris Grant
*Attorney, Agent, or Firm*—Duft, Graziano & Forest

[57] ABSTRACT

A system is disclosed which provides a significantly enhanced transmission rate for digital data transmitted over a channel, while also providing immunity to signal interference caused by multipath reception. One embodiment of the system transmits a signal containing digital data in the vertical blanking interval of a television signal. Before being transmitted, the digital data is modulated by a process called orthogonal frequency division multiplexing, or OFDM. A guard interval is optionally prefixed to the front end of the data signal to provide additional immunity to multipath interference. A further feature of the present system is the optional inclusion in the transmitted signal of an error correcting code which allows detection and correction of multiple sequential data transmission errors.

21 Claims, 7 Drawing Sheets

OFDM LINE STRUCTURE

SYSTEM FOR TRANSMISSION OF DIGITAL DATA USING ORTHOGONAL FREQUENCY DIVISION MULTIPLEXING

FIELD OF THE INVENTION

This invention relates generally to a system for transmitting data through a conventional analog television channel and, in particular, to a system which uses an orthogonal frequency division multiplexing technique to increase the quality and/or transfer rate of data transmitted in the vertical blanking interval of a television signal.

PROBLEM

It is a problem in the area of standard NTSC television transmission to efficiently intersperse "non-picture" data, such as Teletext, with the video "picture" normally viewed on a television screen. There exist at least two present types of non-picture data which are transmitted in an interspersed fashion with the picture data normally viewed on a television monitor. These include "Teletext" (the applicable standard for which is ANSI/EIA-516-1988 in the NTSC video format), and "closed captioned" television data. Both Teletext and closed captioned data are transmitted as one or more horizontal lines during the vertical blanking interval of the television signal. Absent special circuitry designed to extract this information contained in the vertical blanking interval, these two types of non-picture data are not normally displayed on a television employing standard receiver circuitry.

Although Teletext, for example, is widely used (especially in Europe), Teletext data can be corrupted by various forms of interference, such as random noise, impulse noise, carrier wave or multipath interference. Random noise is typically caused by weak signal strength or a poor signal-to-noise ratio in the receiving amplifier. Impulse noise is caused by men-made devices such as automobile ignition systems or electric motors with brushes, or by natural disturbances such as lightning. Multipath interference typically results from a transmitted signal being reflected from buildings or other objects which causes a time-delayed reception of the reflected signal(s) relative to the directly transmitted signal. These reflected, or secondary, signals result in "ghosts" in the picture of a received television signal. Multipath interference presents a particularly severe problem with respect to digital data transmission.

A typical Teletext decoder is designed to compensate somewhat for the aforementioned types of interference. However, the data throughput rate of the Teletext information is accordingly compromised by the compensation techniques which result in a reduced data transmission rate. The Teletext system, as typically implemented, provides for reducing the effects of signal interference from random noise, impulse noise, or carder wave interference by maximizing the peak-to-peak value between voltage levels which represent a logical "0" and a logical "1" in the transmitted data. This is accomplished by limiting the number of levels that data symbols can assume to only two levels. Typically, this scheme is implemented by assigning a 70 IRE signal to logical "1" and a 0 IRE signal to logical "0". A 0 IRE signal represents a black level on a television screen, and a 100 IRE signal represents a white level. This technique provides for a transmission having a relatively high immunity to signal interference. However, since only two logic levels of data are used, only one bit of data per symbol can be transmitted. Therefore, a low data transmission rate results from use of this inefficient method of providing signal interference immunity.

Another feature of the Teletext standard is the use of a Hamming error detecting and correcting code. Unfortunately, use of a Hamming code further reduces the data transmission rate through a channel due to the overhead imposed in implementing the code.

The effects of multipath reception (e.g., ghosts) can be further reduced by the use of an adaptive equalizer. Adaptive equalizers can be employed to correct both ghosted video pictures, as well as ghost-contaminated data. However, adaptive equalizers are not effective if the ghosts change rapidly, since it takes a certain amount of time to detect and then adapt to a change in a signal. Furthermore, adaptive equalizers are relatively expensive because they require complex hardware.

Orthogonal frequency division multiplexing (OFDM) techniques have previously been used primarily for transformation of broadband signals. This use of OFDM with fully digital signals requires that the OFDM transformation process be Performed on a real-time basis. When OFDM techniques using fast Fourier transforms are applied to fully digital data being sent at high data transmission rates, real-time data transformation requires fast and expensive processing hardware.

SOLUTION

The present invention overcomes the foregoing problems and achieves an advance in the art by providing a system which provides a significantly enhanced transmission rate for digital data transmitted over a channel, while also providing immunity to signal interference caused by multipath reception. In one embodiment of the system of the present invention, digital data is transmitted in the vertical blanking interval of a television signal. Before being transmitted, the digital data is first transformed using a Fourier transform method which provides interference immunity and then modulated by a method called orthogonal frequency division multiplexing, or OFDM.

In operation, a block of digital data to be transmitted is transformed by using an inverse discrete Fourier transform which produces a block of data that is used to modulate a single carrier signal. The modulated carrier signal has a plurality of mutually orthogonal components, each of which has a lower frequency (data rate) than the original digital data signal. The single carrier signal can be viewed as being comprised of a plurality of mutually orthogonal carrier signals which have lower frequencies than the original signal. These lower frequency "carrier signals" can be transmitted with more immunity from phase and multipath-induced amplitude distortion than a single modulated higher-frequency signal. Even though interference-induced distortion of the transmitted signal may be relatively large when viewed across the entire transmission (broadband) channel, the distortion is relatively small across each of the limited-bandwidth carrier channels. Therefore, the transformed signal has a high immunity to multipath interference, even when the phase of the received multipath signal is time-varying.

Since the transformed components of the digital data are mutually orthogonal, the carrier channels can have overlapping frequency spectra. This spectral overlap allows an efficiency of use of the transmission channel bandwidth which exceeds that of conventional frequency division multiplexing methods. Therefore, an OFDM system has an intrinsically high spectral efficiency which permits a data transmission rate comparable to that of the Teletext system. If multipath distortion is a primary concern, then an OFDM system implemented in accordance with the present invention can exceed the data transmission rate of the Teletext system. In the present system, an inverse Fourier transform is initially applied to the data to be transmitted, after which the data is filtered and inserted into the vertical blanking interval of the television signal, which is then transmitted to a receiving site. At the receiving site, the transformed data is extracted from the vertical blanking interval of the received television signal. A second Fourier transform, (which is the opposite of the originally applied inverse Fourier transform) is then applied to the transformed data to recover the original data.

Because of the inherent immunity of OFDM signals to multipath and other types of signal interference, minimal adaptive equalization is required to be applied to a received OFDM signal. Adaptive equalization techniques are relatively expensive to implement, and such techniques are required in many cases by digital transmission systems. By comparison, OFDM signal processing techniques provide a significant economical improvement in interference reduction relative to the techniques used by these digital transmission systems. Adaptive equalizers are not generally used for Teletext reception, but are typically considered to be necessary in high definition television (HDTV) systems.

The present invention optionally uses a guard interval which is prefixed to the front end of the data signal to provide additional immunity to multipath interference.

Although OFDM techniques have been used in various types of transmission systems, previous techniques have generally applied the OFDM technique to a total signal, i.e., to the entire spectrum of a totally digital signal for the entire transmission. The present system, however, applies an OFDM technique to only a "block" of data which is then transmitted transparently as a part of the normal television signal. That is, part of the transmission is OFDM transformed, and the rest of the transmission including conventional sync signals and video is not OFDM transformed. When the OFDM signal is modulated within the limits of the NTSC specification, transmission of the OFDM data is via normal television transmitting facilities, and a signal containing OFDM data can be received by a normal television receiver without affecting reception of the television picture.

An important advantage of the present OFDM system over previous OFDM implementations is that the present system uses OFDM-transformed data blocks interspersed with non-OFDM transformed data (i.e., picture information). This interspersing allows significantly more time for processing (transforming and de-transforming) the data than conventional broadband OFDM systems which require that the OFDM transforms be performed continually. In contrast, the present system uses OFDM-processed baseband signals which are interspersed with other baseband television signals. Therefore, the present system allows considerably more time for processing the OFDM signals between subsequent blocks of data. This increase in time for processing allows less expensive hardware to be used in place of the hardware required by convention broadband OFDM methods. In television receivers, where the price of every component is a critical factor, the present system is extremely cost-effective.

Another advantage of the present OFDM system relative to Teletext is that the OFDM system can accommodate data having one or more bits of data per symbol, and can also employ error correcting codes other than Hamming codes, such as a Reed-Solomon code.

In addition to inserting data in the vertical blanking interval, the present system can increase the amount of data transmitted per screen by substituting additional data in place of one or two horizontal scan lines at the top and bottom of the screen.

BRIEF DESCRIPTION OF THE DRAWING

The invention may be better understood from a reading of the following description thereof taken in conjunction with the drawing in which.

Table 1 illustrates a table of random data before and after the transform process to show the details of the transform process.

DETAILED DESCRIPTION OF THE INVENTION

The NTSC television standard specifies a signal which produces a 525 (horizontal) line picture comprising 30 frames per second. Each frame consists of a first and a second field which provide odd and even lines, respectively. A "vertical blanking interval" is inserted between each successive field to allow the receiver to synchronize and to allow for vertical retrace of the electron beam between successive picture fields. Approximately 42 lines are included in each vertical blanking interval. Lines 1 through 9 in both the first and the second field are used for picture synchronization. Lines 10 through 21 in fields 1 and 2 may be used for transmission of various types of signals, such as vertical interval test signals (VITS), ghost canceling reference signals (GCR), and digital data. One standardized format for transmission of digital data in the vertical blanking interval is known as Teletext.

The Prior Art

Figure 7:
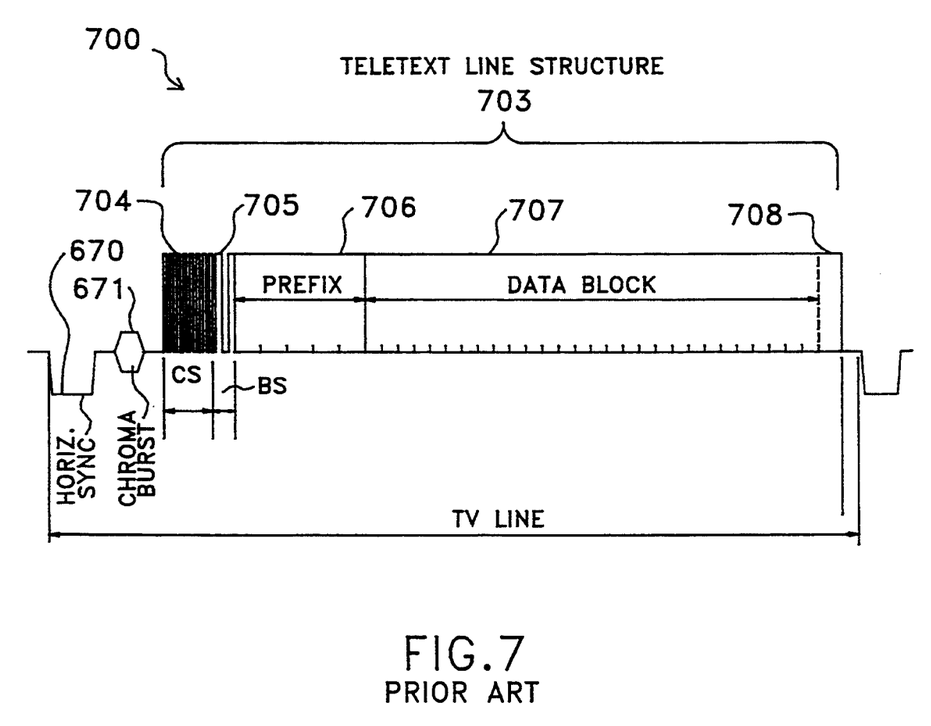
FIG. 7 illustrates the prior art, wherein the format of Teletext data in the vertical blanking interval is shown.

FIG. 7 illustrates the prior art, which shows a Teletext waveform 700 in one line of the vertical blanking interval of a television transmission. The waveform 700 comprises a 4.7 microsecond horizontal sync pulse 670, a chroma burst 671, and a data field 703. Chroma (color sync) burst 671 consists of 8 to 9 cycles of a 3.58 megahertz sine wave. Data field 703 begins approximately 10.48 microseconds after the start of horizontal sync pulse 670, and has a duration of approximately 50.28 microseconds. Data field 703 contains a clock synchronization sequence 704, a byte synchronization sequence 705, a prefix 706, a data block 707, and a suffix 708. The Teletext data symbol rate is nominally 5.727272 million characters per second, which is 1.6 times the chroma burst frequency.

Background of OFDM Signal Processing

Orthogonal frequency division multiplexing (hereinafter referred to as OFDM) is a data transmission technique which is described in U.S. Pat. No. 3,511,936 (issued in 1970). In contrast to techniques which transmit a data stream at a high data rate by modulating a single carrier signal, the OFDM technique divides a data stream into a plurality of data streams, each of which has a lower data rate than the original data stream. Each of these relatively low rate data streams is then used to modulate its own separate carrier signal. In order to provide maximum bandwidth, and to allow ease of processing, the carrier signals must be mutually orthogonal. Any two or more signals are orthogonal if the integral of their product over a defined period of time is equal to zero.

In the past, the OFDM technique was difficult to implement for more than a few carrier signals because it was difficult to build hardware that maintained orthogonality for many carrier signals. This is due to the fact that generation of the OFDM signal was typically accomplished by summing the outputs from a bank of individually modulated phase-locked oscillators. Since it is not practical to phase-lock a large number of oscillators, this technique therefore is not an efficient way of implementing an OFDM signal.

An alternative approach to generating an OFDM signal is to generate the signal digitally using a discrete Fourier transform. The Fourier transform is a technique for representing time-based data in a frequency-based domain. Fourier transforms lend themselves to OFDM techniques because the sine and cosine functions which provide the basis for the Fourier transform, are orthogonal functions.

The discrete Fourier transform as used by the present invention is defined by:

$$G\left(\frac{n}{NT}\right) = \sum_{k=0}^{N-1} g(kT) e^{-j2\pi n \frac{k}{N}}$$

$$n = 0, 1, 2, \ldots, N-1$$

where:
$j = \sqrt{-1}$
$G(\ ) =$ value of sample in frequency domain
$g(\ ) =$ value of sample in time domain
$k =$ discrete sample number in time domain
$N =$ total number of samples in period
$n =$ discrete sample number in frequency domain
$T =$ time between samples
The inverse discrete Fourier transform is defined by:

$$g(kT) = \left(\frac{1}{N}\right) \sum_{n=0}^{N-1} G\left(\frac{n}{NT}\right) e^{j2\pi n \frac{k}{N}}$$

$$k = 0, 1, 2, \ldots, N-1$$

Because of advances in the area of digital signal processing, implementation of OFDM has become significantly more practicable and efficient. This is largely due to improved hardware, software, and algorithms that have been developed to implement the discrete Fourier transform more efficiently. These algorithms are called fast Fourier transforms. The present system utilizes these improved tools in a novel configuration including other novel features to provide an efficient scheme for implementing OFDM transmission of digital data.

Figure 1:
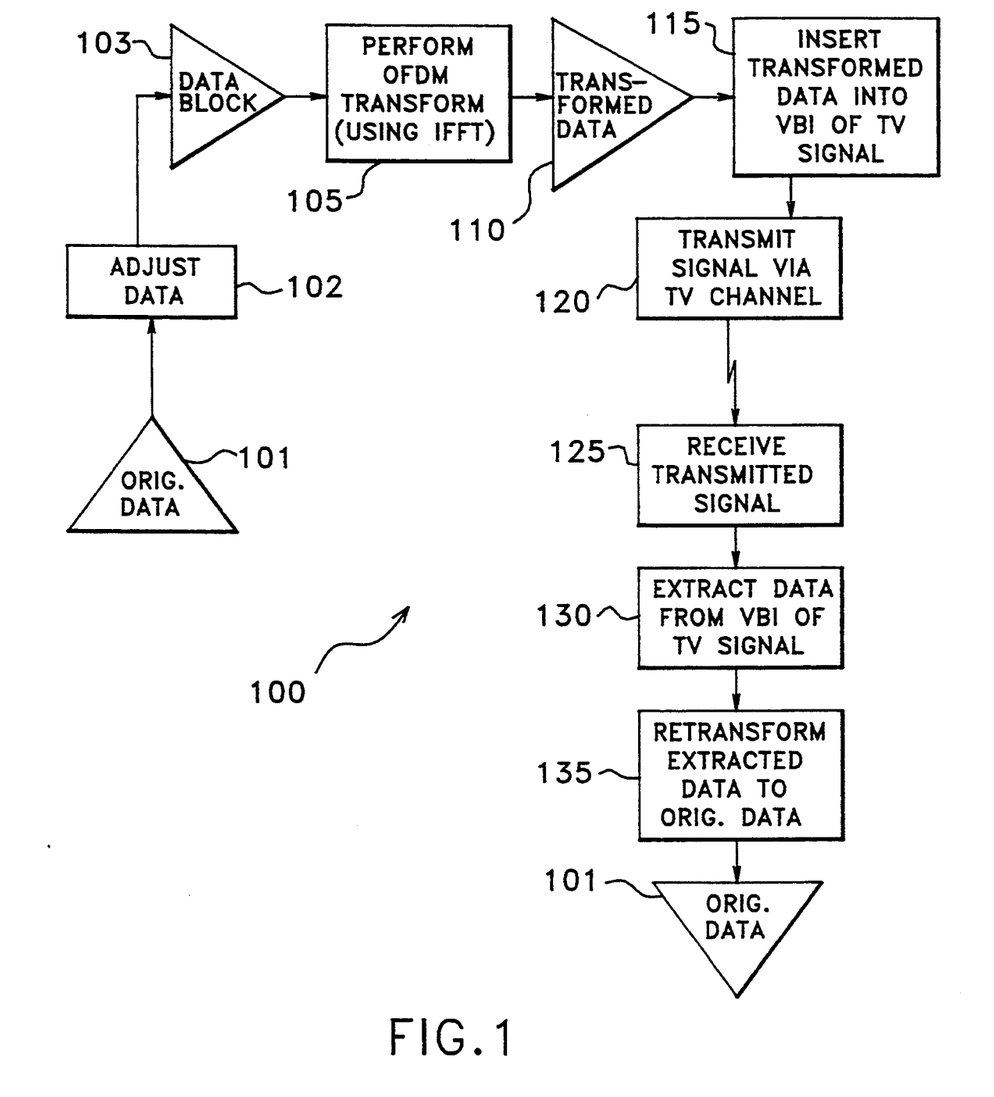
FIG. 1 illustrates an exemplary embodiment of the OFDM system of the present invention.

FIG. 1 is a high-level illustration of an exemplary embodiment of the OFDM system 100 of the present invention. At step 102, a data block 103 is created by adjusting the original data 101 so that there will be no imaginary components produced by the transformation process. This adjustment procedure is described in detail below. At step 105, data block 103 is transformed using a discrete inverse fast Fourier transform (IFFT) to produce transformed data 110. The transformed data 110 is then inserted into the vertical blanking interval (VBI) of the television video signal, at step 115. Next, at step 120, the television signal containing the transformed data 110 is transmitted to a site where it is received at step 125. At step 130, the transformed data 110 is extracted from the vertical blanking interval of the television signal. At step 135, the extracted data is re-transformed (using an "FFT" [Fast Fourier Transform], which is the inverse of the IFFT applied in step 105) to recover the original data 101.

Transform Process Example

Table I contains a set of random numbers that comprise input data used to demonstrate the transform process. The length of the transform process has been shortened to 64 samples for the sake of brevity. Column 1 identifies sample numbers. Column 2 is organized into 32 pairs of 2-bits each, and contains 64 bits of pseudo-random input data 101 that is to be transformed and then transmitted. Each of these bit pairs can be considered to be a data symbol, for example. In operation, the incoming data stream of 1's and 0's is loaded into serial-to-parallel convertor 431 as represented by column 2 in a left-to-right and descending order from samples 1 to 32, giving a total of 64 bits of information. Column 3 is a mapping of the real data part of the bit pairs in column 2 into four-level data, wherein the four possible data levels are $-3$, $-1$, $+1$, and $+3$. For example, the bit pair [0,0] representing sample number 1 in column 2 maps to a level of $+3$ in column 3. Bit pair [0,1] for sample number 3 maps to a level of $+1$. A [1,0] bit pair maps to a level of $-1$, and a [1,1] bit pair maps to a level of $-3$.

Sample number 0 in column 3 is forced to a value of 0 so that the transformed data will have a zero DC level. Sample numbers 33 to 63 in column 3 are mirror-imaged about the 32nd data point in order to provide even symmetry. That is, in column 3, sample number 31 is the same as sample number 33, sample number 30 is the same as sample number 34, etc. In general, sample $(32-n)$ is the same as $(32+n)$ where n is any integer between 1 and 31. Column 4 contains all 0's, because the imaginary part of all of the transformed has been forced to a zero value. Columns 3 and 4 form data block 103. A 64 point inverse discrete Fourier transform is performed on the data columns 3 and 4, with column 3 being the real terms, and column 4 containing the imaginary terms. The real part of the transform result is shown in column 5 and the imaginary part of the transform is shown in column 6. It can be observed that the terms in column 5 are symmetrical about the 32nd point, and the terms in column 6 are all 0's. This is a result of the property of an inverse Fourier transform of producing an even and real only result from an even and real only input. The data in the top half of column 5 (samples 0 through 32) is the transformed data 110 which is transmitted. If a Fourier transform is applied to the data in columns 5 and 6, the data in columns 3 and 4 can be recovered. The text, *C Language Algorithms for Digital Signal Processing*, by Embree and Kimble provides computer source code for fast Fourier and inverse Fourier transforms.

Figure 2:
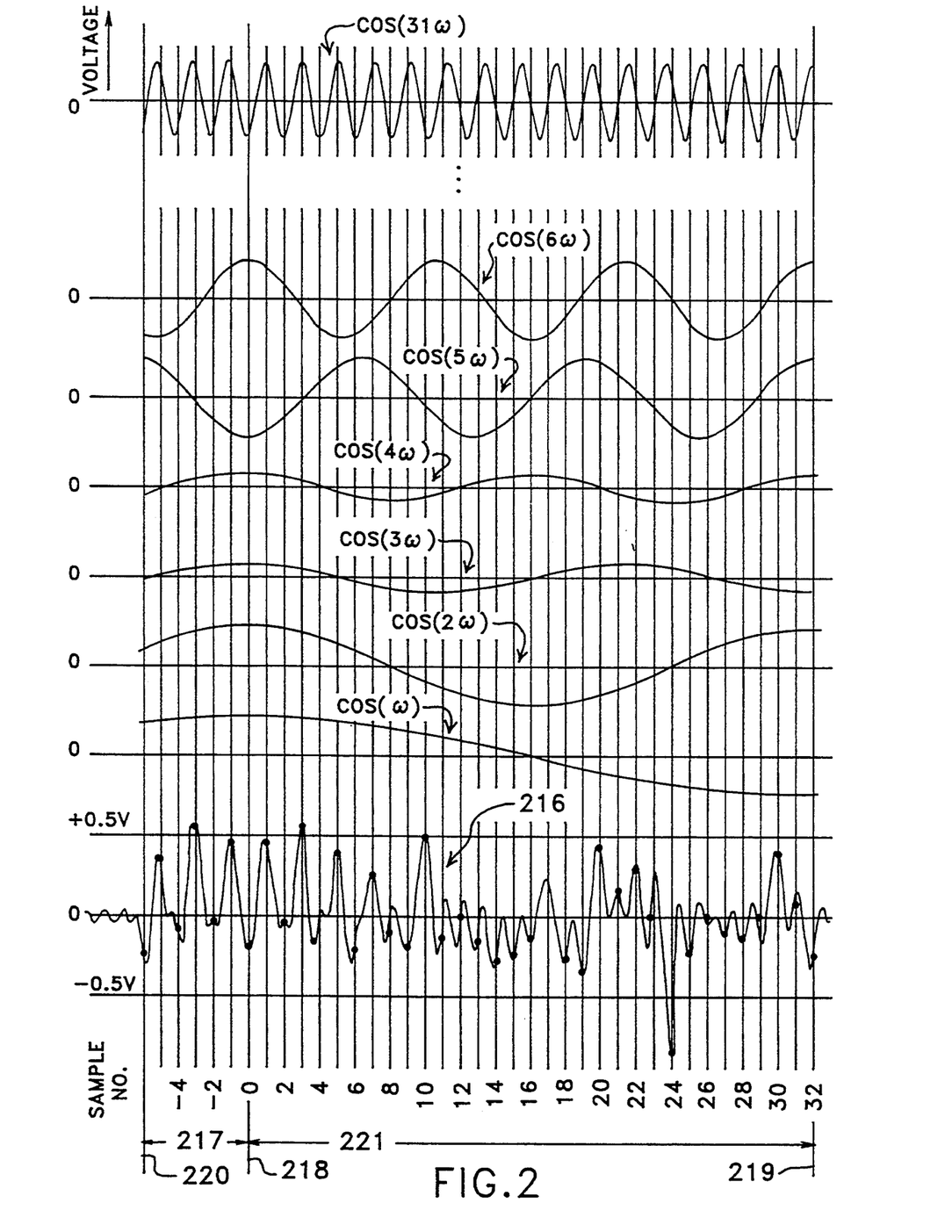
FIGS. 2 and 3 illustrate a baseband OFDM signal as a function of voltage versus time and voltage versus frequency, respectively.
Figure 3:
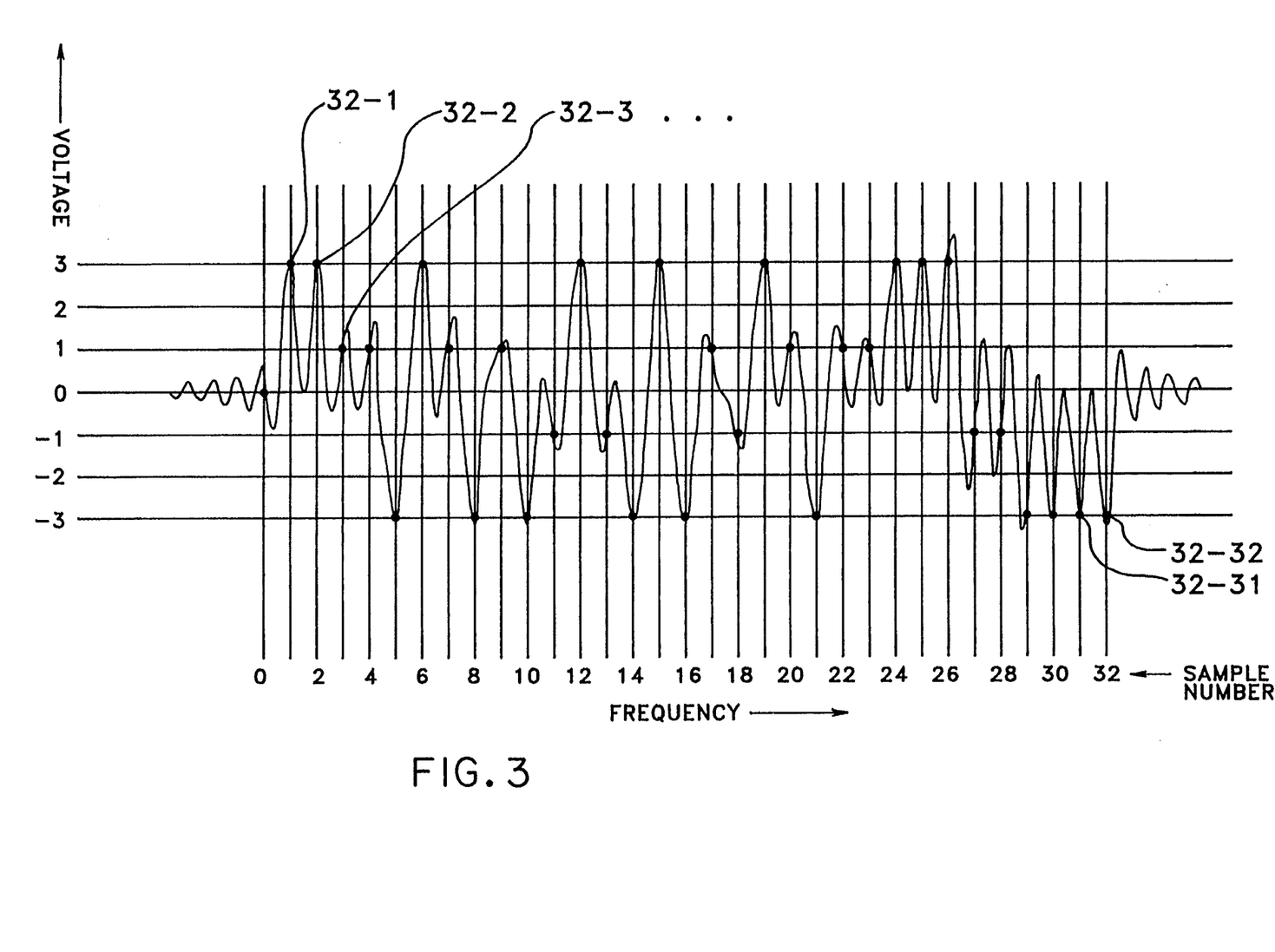

FIGS. 2 and 3 illustrate a baseband OFDM signal as a function of voltage versus time and voltage versus frequency, respectively. The OFDM signals shown in FIGS. 2 and 3 are comprised of 33 real-only terms. In FIG. 2, waveform 216 is the signal that is actually sent via system 100. The waveform voltage at each sample number during time interval 221 is the corresponding value from column 5 in Table I. The sample times are marked with heavy dots.

The waveform in the time domain may be viewed as a sum of 33 sequential rectangular pulses that have been low-pass filtered by a filter meeting the Nyquist criteria. A single pulse passing through such a low-pass filter produces a $\sin(x)/x$ waveform. The amplitude of each pulse was obtained from column samples 0 through 32 in column 5 of Table I.

If waveform 216 is decomposed into its constituent components, it is seen to be made up of 32 cosine waves, seven of which are shown in FIG. 2. The first through the sixth and the 31st are shown as $\cos(\omega)$ through $\cos(6\omega)$ and $\cos(31\omega)$. These cosine waves represent the first through sixth, and the 31st harmonics of a typical OFDM waveform. The seventh through the 30th and the 32nd harmonics are not illustrated, but their effect is included in waveform 216. The DC component, not shown, has been forced to zero.

As can be seen from column 3 in Table I, there are four different data values: 3, 1, −1, or −3, each of which is determined by the amplitude of the corresponding cosine waveform shown in FIG. 2. The amplitudes of waveforms $\cos(\omega)$ through $\cos(6\omega)$ and $\cos(31\omega)$ can also be found as sample numbers 1 through 6 and 31, respectively, in column 3 of Table I. For example, waveform $\cos(5\omega)$ has an amplitude value of −3, which is representative of sample 5 in column 3 of Table I. Column 2 shows that the −3 amplitude was generated by the data bit pair [1,1]. Each of the OFDM signal components (not shown) between waveforms $\cos(6\omega)$ and $\cos(31\omega)$ has a data state of either +3, +1, −1, or −3. Time markers 218 and 219 mark the beginning and the end of the half of the OFDM transform period that is transmitted, hereinafter referred to as data block 110. As indicated above, only half of the transformed data need be transmitted, since the data values are forced to be symmetrical. Note that a "guard interval" 217, located between time markers 220 and 218, has been added as a prefix to the waveform 216. Guard interval 217 is a redundant signal identical to a slice of data taken from the end of the transform, sample numbers 58–63 in column 5 of Table I. The function of a guard interval, which is an optional feature of the present invention, is discussed in detail below.

FIG. 3 is a graph of voltage versus frequency for the waveform 216 shown in FIG. 2. As shown in FIG. 3, when waveform 216 is examined in the frequency domain with all 32 cosine terms present, it can be seen that 32 separate carrier signals are present. The first carrier signal 32-1 is the first harmonic term of waveform 216, the second carrier signal 32-2 is the second harmonic term, and so forth. The amplitude of the carrier signals 32-* is examined at the correct sample frequencies, which are shown as heavy dots. The next to rightmost carrier signal 32-31 is the 31st harmonic of waveform 216. Each of these carrier signals 32-1 through 32-32 corresponds to waveforms $\cos(\omega)$ through $\cos(32\omega)$, respectively, as shown in FIG. 2. For example, carrier signal 32-3, FIG. 3 has an actual value of +1, which is the amplitude of the component $\cos(3\omega)$ in FIG. 2, which is found as sample number 3, column 3 in Table I.

The standard modulation format for television transmission is known as vestigial sideband modulation. The graphs in FIGS. 2 and 3 are shown as baseband waveforms rather than radio frequency (RF) waveforms. It is presumed that the television modulation and demodulation process is sufficiently accurate in passing baseband signals between a transmitting and receiving site so that the OFDM process functions without impairments (i.e., signal distortion) other than those caused by the transmission path.

It should be noted that the OFDM system 100 described herein is amenable to applications including transmission of OFDM data over satellite networks, or transmission via fiber optics or other types of cable, as well as recording of OFDM data on magnetic or optical media including magnetic tape and laser discs, which media further includes compact discs ("CDs") in addition to other storage means.

Guard Interval

The immunity of an OFDM signal from multipath interference is due to the slower data rate of the individual carrier signals which effectively replace the original faster data rate single carrier signal. If the delay of the received multipath reflection is short relative to the duration of the data interval (shown between 218 and 219 on FIG. 2), the effect of the reflection (i.e., ghosting) will be minimal. The present system 100 employs an optional guard interval 217 to increase immunity of the system 100 to multipath interference. A guard interval is a slice of data (e.g., 217 on FIG. 2) copied from the (unsent) tail end of the transformed data, and placed as a preamble in front of the data block 103 to provide a redundant data slice. Because this transform was symmetrical, the data slice 217 appears to be a mirror image around sample number 0. When guard interval 217 is added to the signal to be sent, and the guard interval 217 is longer than the delay of any of the multipath reflections, then the effect of ghosting can be further reduced.

Transmitting Hardware

Figure 4:
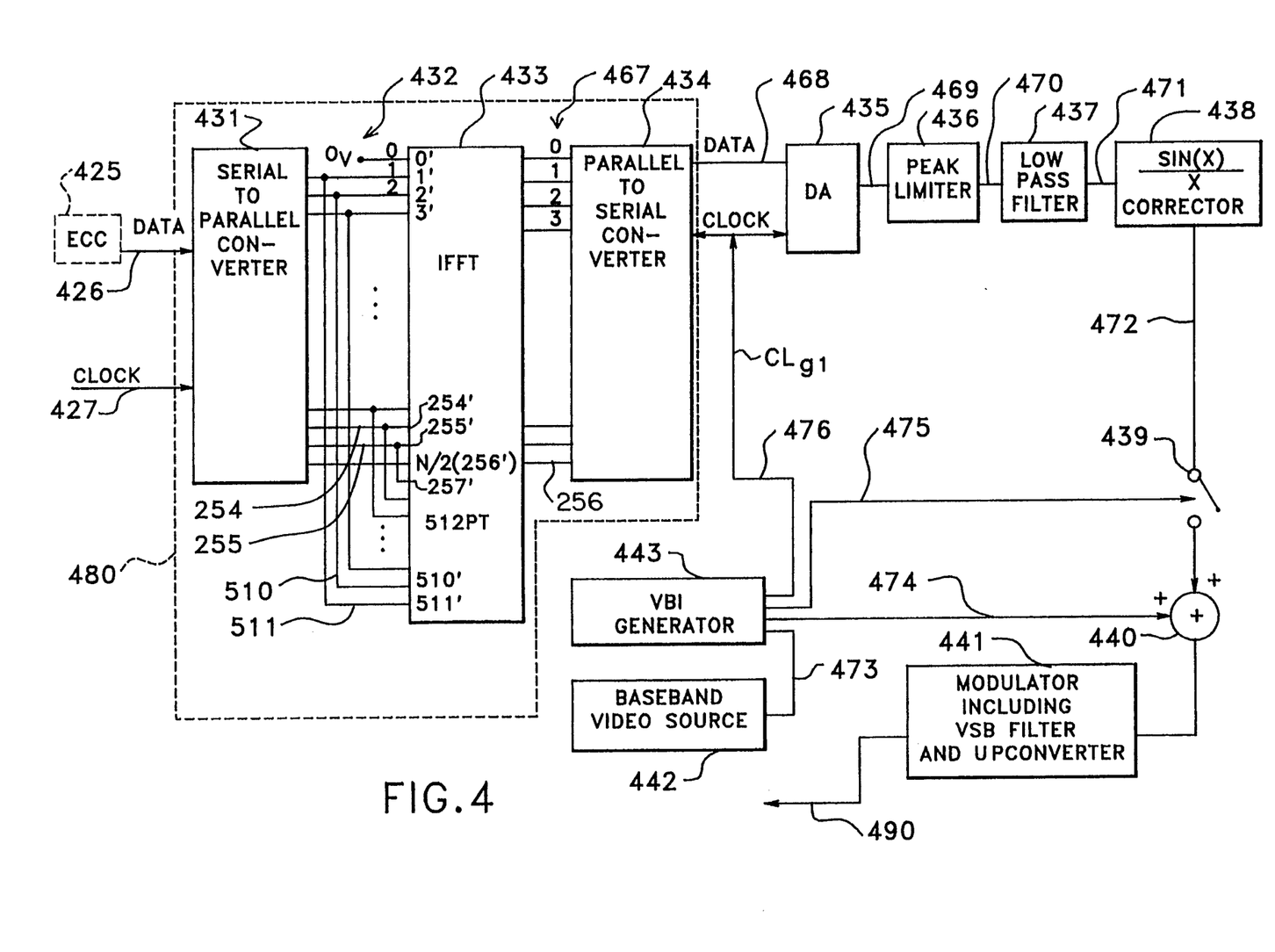
FIG. 4 is a block diagram of the hardware employed to transmit the OFDM signal.

FIG. 4 is a block diagram of the hardware employed at the transmitting end of the present OFDM system 100. The OFDM signal processing may be performed using a special DFT (Discrete Fourier Transform) chip, or either a general purpose microprocessor or a DSP (Digital Signal Processing) chip programmed to perform a fast Fourier transform. In the diagram shown in FIG. 4, a block of 256 symbols is transformed and sent on one vertical blanking interval line using a 512 point inverse fast Fourier transform ("IFFT"). The data symbols used in FIG. 4 are again 4-level symbols; i.e., each symbol can be represented by two bits. A similar approach could use a single level per symbol for lower speed data, with the benefit of lower susceptibility to random (Gaussian) noise. However, use of the present system of transmitting OFDM data can provide an increased data transmission rate while providing an improved level of immunity to multipath interference when compared to the Teletext system.

The data to be transformed by the present system is presumed to be random and preferably has a zero or near zero DC component. If this is not the case, the data can be pre-processed using a technique such as differential encoding.

As shown in FIG. 4, a data block 103 to be transformed is serially input on line 426 to serial-to-parallel convertor 431, where it is converted to parallel data. Clock signal 427 is used to clock in the data at any arbitrary rate sufficiently fast to allow time for OFDM processing of the data block 103 in the vertical blanking interval. Clock signal 427 makes a transition in the middle of the bit input period.

The Fourier transform and its inverse transform operate on complex numbers, which have both real and imaginary components. However, a conventional television channel does not have an accompanying quadrature carrier signal. This means that the channel is not readily amenable to transmission of both real and imaginary components of a given signal. To avoid the necessity of a quadrature or other additional carrier signal for transmitting imaginary signal components, the input data on line 426 is modified to contain real terms only. This is accomplished by making the real components of the data have even symmetry about the data block 103, and forcing the imaginary components of the data to have odd symmetry (or be all zeroes) about the data block 103, as was demonstrated in Table I.

One way of forcing the real components of the data to assume even symmetry is to input a duplicate of each input data point (N/2−1, N/2−2, ... N/2−n) as a second data point (N/2+1, N/2+2, ... N/2+n), where n is the number of a particular data point, and N is the size of the transform. Making the imaginary components all zero satisfies the condition that imaginary components have odd symmetry. Therefore, in order to eliminate the imaginary signal components, each output data line 432 from serial-to-parallel converter 431 is "hard-wired" to two inputs of inverse discrete fast-=Fourier processor 433. IFFT processor 433 could be, for example, a "dedicated" chipset such as a Plessey PDSP 16510, a digital signal microprocessor (DSP) chip such as a Motorola 56001, or any suitable general purpose microprocessor. If processor 433 is either a DSP or a general purpose microprocessor, then the serial-to-parallel conversion function of block 431 could also be performed therein, as indicated by dotted box 480. As shown in FIG. 4, each of the 256 outputs of serial-to-parallel converter 431 is input to two inputs of IFFT 433. For example, output (bit no.) 1 from serial-to-parallel converter 431 is connected to both inputs 1' and 511' of IFFT 433; output 2 from converter 431 is connected to both inputs 2' and 510' of IFFT 433; and so on, with output 255 (N/2−1) being connected to inputs 255' and 257' of IFFT 433. This duplication of data points doubles the number of points that must be transformed, but eliminates the need for an additional carrier channel. Note, however, that after transformation of the N points, only N/2+1 points remain to be transmitted, since all imaginary transformed components have been forced to assume zero values, and the real data is symmetrical and therefore half is redundant. The process of canceling imaginary components was shown as being "hardwired" for the purpose of illustration. If the IFFT transform is to be performed on a DSP chip or on a general purpose microprocessor, then the "hardwired" duplication of data points is executed totally in software. Likewise, the serial-to-parallel and parallel-to-serial conversion functions can be done by a DSP chip or a microprocessor if input-output rates are sufficiently fast.

Data is latched into IFFT 433 at any sufficiently fast rate so that it can be processed and placed in successive vertical blanking intervals. The transformed data output from IFFT 433 is transmitted via lines 467 to parallel-to-serial converter 434. As the digital data is shifted out of parallel-to-serial converter 434 at the desired symbol transmission rate, it is transmitted via line 468 to digital-to-analog (D/A) converter 435 where it is converted to analog data. Peak limiter 436 receives analog output from D/A converter 435 on line 469. Peak limiter 436 prevents any data having an abnormally high value from under- or over-modulating the signal being processed by the system 100.

The amount of clipping of the signal by peak limiter 436 should be constrained to limit transmitted values between −20 IRE and 100 IRE to conform to the NTSC transmission system. Any clipped component is functionally equal to impulse noise in the data, and the inverse transform process will spread the "noise" to all of the transformed symbols.

The analog signal is next sent on line 470 to low-pass filter 437, which band-limits the data and removes any aliasing components. Low-pass filter 437 may be either an analog or a digital filter having a frequency response meeting the Nyquist criteria. Such frequency response is satisfied, for example, by a filter implementing a raised cosine curve. If a digital filter, such as an ITT model TFIR 6400A, were be employed as loss-pass filter 437 it would normally be located before the D-A converter 435. A $\sin(x)/x$ corrector 438 receives the output from low-pass filter 437 on line 471. The operation of the $\sin(x)/x$ corrector 438 is discussed in Appendix C of Digital Telephony by John C. Bellamy. Alternatively, digital filtering, clipping, bandwidth limiting and $\sin(x)/x$ correction may be performed before the data is passed through D/A converter 435. In this case, only anti-aliasing filtering is required after the D/A operation.

The original video signal is output from video source 442 on line 473 and is then sent to vertical blanking interval generator 443 which extracts timing and gating information from the signal. Gating information is then sent from vertical blanking interval generator 443 via line 475 to gate 439. Gating information is derived by detecting a selected line in the vertical blanking interval. Gate 439 operates to insert the data into the vertical blanking interval of the original video signal. Vertical blanking interval generator 443 also sends a gated clock signal $CL_{g1}$ via line 476 to parallel-to-serial converter 434 to control the timing of the data conversion.

The processed analog data is sent on line 472 to signal gate 439 where it is added by summer 440 to a video pedestal signal sent via line 474 from vertical blanking interval generator 443. The summed signals form the composite video signal to be transmitted. The composite video signal is passed to modulator 441, which modulates the baseband video to the desired channel frequency. At this point, the modulated RF signal is output on line 490 and may be transmitted via cable or RF means. The video signal may also be stored on magnetic or optical media by sending the baseband video out from summer 440 to a recording device having a video input. In this situation, block 441 is a recording device instead of a modulator, and line 490 is a video output signal.

Error Correction

A sufficiently strong CW carrier signal interfering with an OFDM transmission can cause one or more symbols to be lost in each transform period, but if error correcting codes are used, the lost information can be recovered. As shown in FIG. 4, optional block 425 is used to encode the data with an error detecting and correcting code, such as a Hamming code, Reed-Solomon code, or convolutional coding technique. Any type of error correcting code can be used, with a resulting trade-off between the amount of data space in each data block 103 usurped by the coding scheme and the number of correctable errors in a given data block 103. A corresponding optional block 525 is shown in FIG. 5, described below.

Receiving a Hardware

Figure 5:
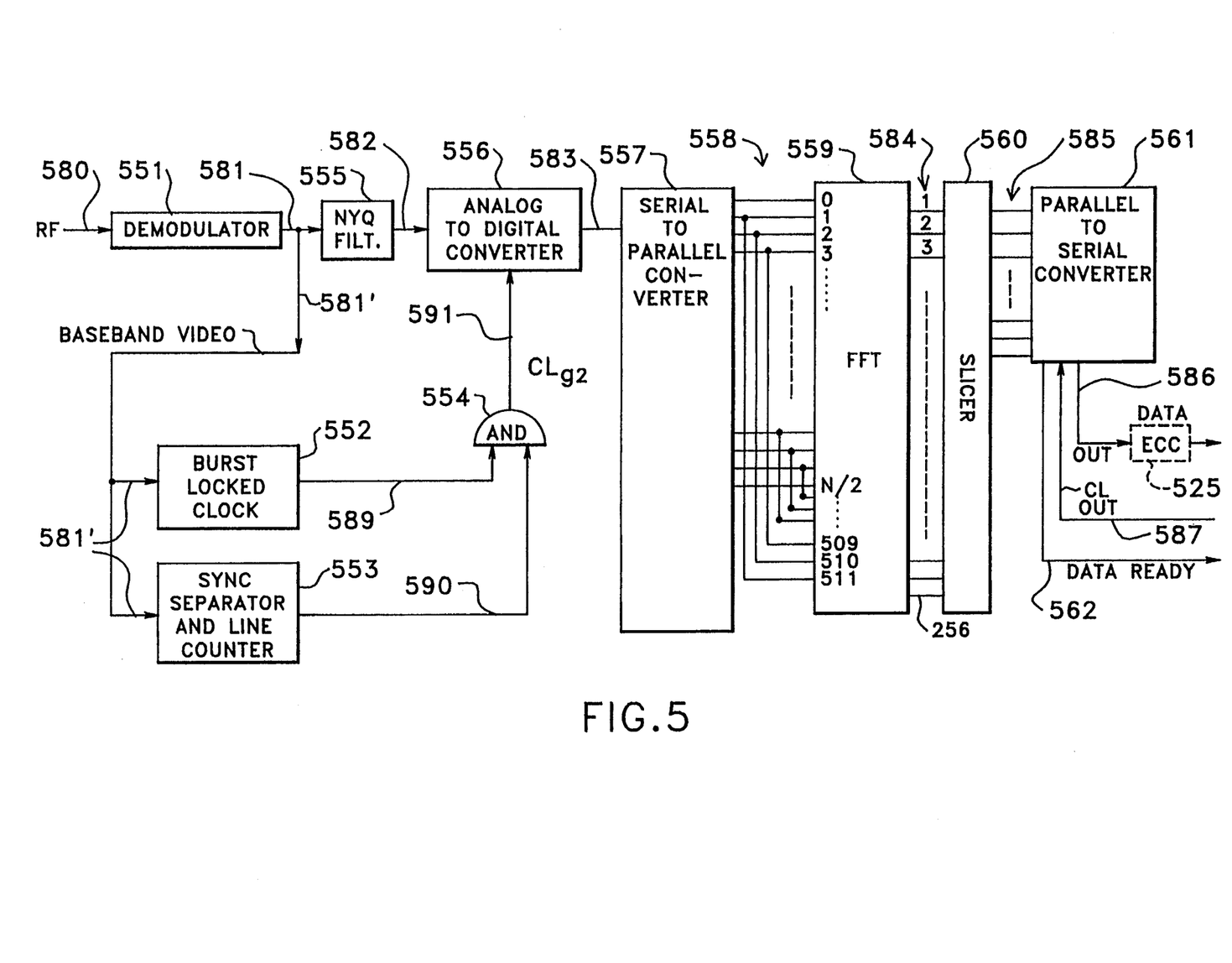
FIG. 5 is a block diagram of the hardware employed to receive the transmitted OFDM signal.

FIG. 5 is a block diagram of the hardware employed at the receiving end of the OFDM system 100. As shown in FIG. 5, demodulator 551 receives an RF signal on line 580 containing interspersed OFDM-transformed data, and produces a baseband video signal which is output on lines 581 and 581'. This baseband video signal is used to phase lock burst-locked clock 552 to the OFDM data rate. Clock 552 is synchronized with the chroma burst signal 671 (shown in FIG. 6). Clock 552 generates a fractional multiple of the chroma burst frequency (e.g., 9/5 times the chroma burst frequency). Sync separator/line counter 553 produces a gating pulse on line 590 for the duration of the OFDM signal, excluding the guard interval 217. Outputs from burst-locked clock 552 (on line 589) and sync separator/line counter 553 are ANDed by AND gate 554 to produce a gated clock signal $CL_{g2}$ on line 591, which is connected to analog-to-digital (A/D) converter 558. The gated clock signal $Cl_{g2}$ is accurately timed to start sampling the OFDM data at the start of the data block 103. Data on line 581 is input to Nyquist filter 555 where it is pulse-shaped in order to reduce noise without adding intersymbol interference. A/D converter 558 receives the pulse-shaped data on line 582, and converts the data to a digital format, using clock signal $CL_{g2}$ to determine when to sample the analog data. After being converted to digital form by A/D converter 556, the data is sent via line 583 to serial-to-parallel converter 557, where it is converted to a parallel format and stored in a byte format. As explained with reference to FIG. 4, each 256 samples are duplicated by wiring 558 to provide even symmetry about each data block 110. The received data block 110 is then transformed by discrete fast Fourier processor ("FFT") 559. The transform employed by FFT processor 559 is the inverse of the transform initially used to transform the data. The resulting data is output as 256 signals (bytes) on lines 584 to a decision circuit ("slicer") 560 which determines, for each line, which of the 4 possible symbols was most probably sent. The symbols are then sent via lines 585 to parallel-to-serial converter 561, where they are stored until they are output on line 586 in response to clock signal $CL_{out}$ on line 587. Data ready line 582 goes high when the data is ready, and clock signal $CL_{out}$ may operate at any sufficiently high frequency to remove the data before the data from the next transform arrives. The decoded symbols are then error corrected if the data was encoded, and are differentially decoded if the data was differentially encoded.

Figure 6:
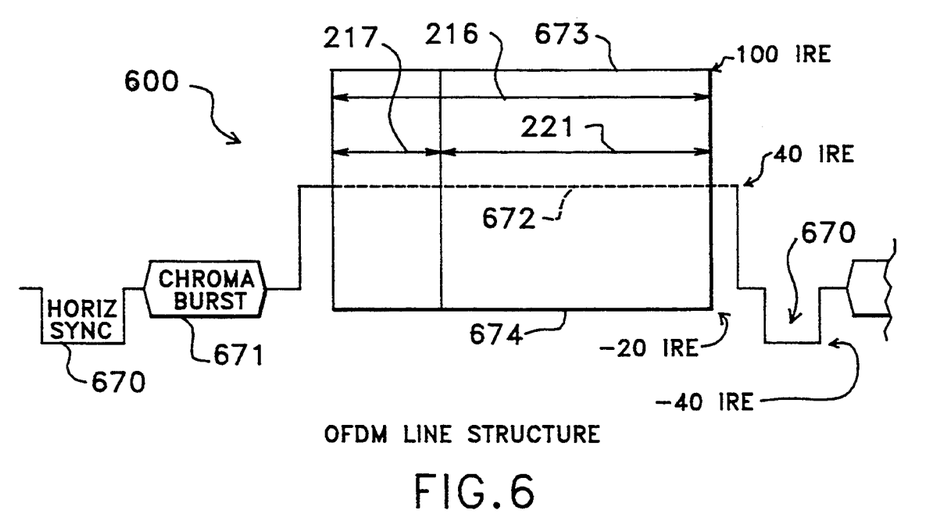
FIG. 6 illustrates the specific characteristics of an OFDM signal placed in a horizontal television line.

FIG. 6 illustrates the details of one possible exemplary embodiment of the OFDM system 100, wherein an OFDM signal is placed in a horizontal television line 64:)0. As shown in FIG. 6, the television signal comprises a horizontal sync pulse 670, a color ("chroma") sync burst 671, and a pedestal 672, upon which the OFDM data (not shown) is placed. The amplitude of pedestal 672 is selected to allow maximum dynamic range for the OFDM data without white clipping or exceeding the horizontal sync tips. In the present example, pedestal 672 is set at 40 IRE. Positive clip level 673 and negative clip level 674, which are 100 IRE and −20 IRE, respectively, define the bounds of the amplitude of the OFDM data. The guard interval is shown at 217, and the initial OFDM data is located in the area indicated by 221. The total OFDM transformed data block 216 is represented by the concatenation of guard interval 217 plus data block 221. The length of guard interval 217 is selected according to the particular transmission path to be used. For example, guard intervals of approximately 10 microseconds (10 μs) for terrestrial broadcasting and 2 μs for cable transmission may be optimum values, while no guard interval at all may be desired for satellite broadcasting. In the present example, the clock rate of clock $CL_{g1}$ is 6.443 MHz, which is 1.8 times the chroma burst frequency, the guard interval 217 has a length of 64 clock cycles (9.993 μs), and the OFDM data in block 103 has a length of 257 clock cycles (39.88 μs), thus giving a total data period of 49.82 μs.

Therefore, 256 symbols can be transmitted in each line 600. Furthermore, there are typically 12 lines available in each vertical blanking interval for inserting data, and 2 vertical blanking intervals per frame, since frame comprises two fields. Any or all of these 12 lines may be used for transmitting OFDM data according to the present invention. At the standard rate of 30 frames per second, the resultant data transmission rate for OFDM data in the vertical blanking interval (ignoring FCC requirements for terrestrial broadcast) is thus:

$$256 \times 12 \times 2 \times 30 = 184,300 \text{ symbols per second.}$$

A further alternative of the present embodiment gains a further increase in the overall transmission rate by placing OFDM data in additional lines 600 on either side of the vertical blanking interval. In a typical television signal, one or two lines at the top and the bottom of each frame are not visible on a television screen. These lines can also be used to transmit OFDM data by treating the lines as if they were included in the vertical blanking interval. It is to be noted that the present system 100 would function effectively by placing OFDM data into any part of the horizontal line structure of the television signal. This horizontal line structure includes horizontal lines other than those lines in the vertical blanking interval, and also could include the entire television transmission for selected time intervals, such as those used for television commercials, etc.

Improved Data Recovery

The use of a guard interval 217 is generally effective in eliminating the effects of multipath interference, but a relatively short multipath delay will still cause a frequency selective compression or expansion of the carrier signal. For instance, if the reflection is equal in amplitude to the main carrier signal, and is 180 degrees out of phase at some frequency in the band, then the carrier signal will completely disappear at that frequency. Therefore, a one-tap equalizer, which multiplies the level of a given symbol by a calculated value ("tap coefficient") to correct the symbol amplitude, could be used to offset the effects of signal reflections. Alternatively, an adjustable level data slicer could also be used to improve the accuracy of the data recovery. Such a data slicer would allow a more accurate determination of the data level by dynamically adjusting the reference level used to determine the data amplitude at a given time.

Other possible methods of providing improved data recovery accuracy include:

(1) sending a reference OFDM carrier signal in some small fraction [e.g., 1%] of the fields with all fixed values, and using the reciprocal of the received values as tap coefficients;

(2) sending a "sliding" reference with fixed values in some positions in every field, and moving the fixed positions from field to field, so that the frequency response can be characterized at every frequency; or (3) using no reference signal at all, but examining the data for a peak level. A peak will be received eventually if the data is random, and the tap can be calculated using this peak.

(4) capture and analyze the ghost canceling reference signal (GCR) for frequency response and phase data. Use the reciprocal of the frequency response at each sample point as the tap coefficient.

Signal Timing

Figure 8:
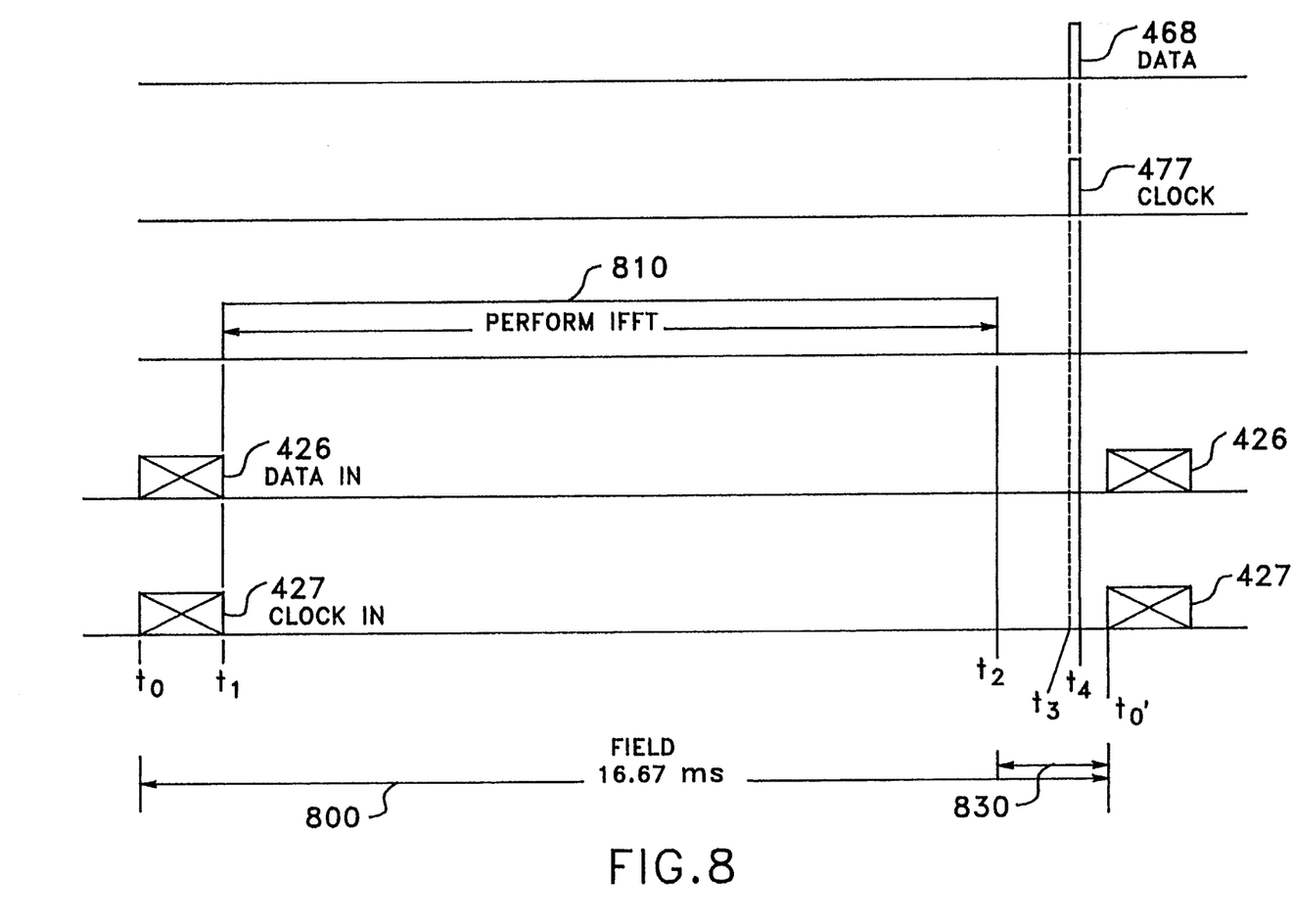
FIG. 8 is a timing diagram showing the interrelationships between various clock signals and transmission of OFDM data in a horizontal television line.

FIG. 8 is a timing diagram showing the interrelationships between various clock signals and transmission of OFDM data in a 16.67 millisecond field 800, which is shown starting at t0, and ending at t0'. The vertical blanking interval 830 is shown as the interval between t2 and t0'.

In the interval between t0 and t1, data on line 426 is clocked into serial-to-parallel converter 431 using clock signal 427. When the desired number of symbols of data have been clocked in (256 symbols or bits in the present example), then at t1, a transform is performed on the data stored in serial-to-parallel converter 431 is performed by IFFT processor 433. This OFDM transform process can be initiated by a data ready line, or a clock pulse counter (not illustrated). The input data is OFDM transformed during the interval 810 between t1 and t2. Near the end of interval 810, data which has been transformed by block 433 is transmitted to parallel-to-serial converter 434 where it is stored until t3. The interval between t2 and t3 is the wait time between the completion of the OFDM data transformation and the first line 600 in the vertical blanking interval 830 in which the OFDM transformed data is to be inserted. A clock signal $CL_{g1}$ of approximately 6.44 MHz is applied at t3 to parallel-to-serial converter 434 to cause the data therein to be clocked out into D/A converter 435 on line 468. The transformed data is then inserted into the active part of the vertical interval of the appropriate line 600. The interval between t3 and t4 represents the interval into which OFDM data is inserted into one line within the vertical blanking interval 830.

If more than one line in the vertical blanking interval 830 is to have OFDM data inserted therein, then the IFFT transformation for the lines subsequent to the first OFDM transformed line is performed concurrently with interval 810.

Clocking of Data

The timing accuracy of clock signal $CL_{g2}$ used to capture the received OFDM data is critical. Furthermore, timing accuracy is difficult to maintain in the presence of strong multipath interference. Therefore, the clock signal is frequently locked onto the chroma burst sync signal 671. There are, however, additional methods of locking the clock signal, such as placing a header in the OFDM data to allow accurate clock timing relative to the received OFDM data.

From the above description it is clear that a block of data can be transformed using a discrete inverse Fourier transform to produce data which can then be used to modulate a single carrier signal which has the appearance of a plurality of mutually orthogonal low-speed carrier signals. The advantages of sending transformed data include increased multipath immunity, increased impulse noise immunity, and, if error correcting codes are used, additional immunity from channel impairments or interference. Impulse immunity of the OFDM system 100 is due to the property of the Fourier transform to spread the energy of an impulse (e.g., impulse noise) in the time domain over the frequency domain. Therefore, since a single impulse in the time domain will have its energy spread over many symbols in the frequency domain, minimal loss of the data integrity will result.

TABLE I

| Column | Legend |
|---|---|
| 1 | SN sample number |
| 2 | ID input data (2 bits) |
| 3 | RE 4-level data real part |
| 4 | IM 4-level data imaginary part |
| 5 | RE IFFT transformed data real part |
| 6 | IM IFFT transformed data imaginary part |

TRANSFORMATION DIRECTION
→IFFT→
←FFT←

| SN | ID | RE | IM | RE | IM |
|---|---|---|---|---|---|
| 1 | 2 | 3 | 4 | 5 | 6 |
| 0 | — | 0.0 | 0 | −.203 | 0 |
| 1 | 0 0 | 3.0 | 0 | .468 | 0 |
| 2 | 0 0 | 3.0 | 0 | −.021 | 0 |
| 3 | 0 1 | 1.0 | 0 | .563 | 0 |
| 4 | 0 1 | 1.0 | 0 | −.048 | 0 |
| 5 | 1 1 | −3.0 | 0 | .351 | 0 |
| 6 | 0 0 | 3.0 | 0 | −.220 | 0 |
| 7 | 0 1 | 1.0 | 0 | .240 | 0 |
| 8 | 1 1 | −3.0 | 0 | −.055 | 0 |
| 9 | 0 1 | 1.0 | 0 | −.186 | 0 |
| 10 | 1 1 | −3.0 | 0 | .481 | 0 |
| 11 | 1 0 | −1.0 | 0 | −.072 | 0 |
| 12 | 0 0 | 3.0 | 0 | −.075 | 0 |
| 13 | 1 0 | −1.0 | 0 | −.143 | 0 |
| 14 | 1 1 | −3.0 | 0 | −.293 | 0 |
| 15 | 0 0 | 3.0 | 0 | −.253 | 0 |
| 16 | 1 1 | −3.0 | 0 | −.141 | 0 |
| 17 | 0 1 | 1.0 | 0 | .236 | 0 |

TABLE I-continued

| | | | | | | |
|---|---|---|---|---|---|---|
| 18 | 1 0 | −1.0 | 0 | −.260 | 0 |
| 19 | 0 0 | 3.0 | 0 | −.335 | 0 |
| 20 | 0 1 | 1.0 | 0 | .434 | 0 |
| 21 | 1 1 | −3.0 | 0 | .154 | 0 |
| 22 | 1 0 | 1.0 | 0 | .271 | 0 |
| 23 | 0 1 | 1.0 | 0 | .025 | 0 |
| 24 | 1 1 | −3.0 | 0 | −.851 | 0 |
| 25 | 0 0 | 3.0 | 0 | −.217 | 0 |
| 26 | 0 0 | 3.0 | 0 | .009 | 0 |
| 27 | 1 0 | −1.0 | 0 | −.110 | 0 |
| 28 | 1 0 | −1.0 | 0 | −.124 | 0 |
| 29 | 1 1 | −3.0 | 0 | −.033 | 0 |
| 30 | 1 1 | −3.0 | 0 | .408 | 0 |
| 31 | 1 1 | −3.0 | 0 | .063 | 0 |
| 32 | 1 1 | −3.0 | 0 | −.328 | 0 |
| 33 | | −3.0 | 0 | .063 | 0 |
| 34 | | −3.0 | 0 | .408 | 0 |
| 35 | | −3.0 | 0 | −.033 | 0 |
| 36 | | −1.0 | 0 | −.124 | 0 |
| 37 | | −1.0 | 0 | −.110 | 0 |
| 38 | | 3.0 | 0 | .009 | 0 |
| 39 | | 3.0 | 0 | −.217 | 0 |
| 40 | | −3.0 | 0 | −.851 | 0 |
| 41 | | 1.0 | 0 | .025 | 0 |
| 42 | | −1.0 | 0 | .271 | 0 |
| 43 | | −3.0 | 0 | .154 | 0 |
| 44 | | 1.0 | 0 | .434 | 0 |
| 45 | | 3.0 | 0 | −.335 | 0 |
| 46 | | −1.0 | 0 | −.260 | 0 |
| 47 | | 1.0 | 0 | .236 | 0 |
| 48 | | −3.0 | 0 | −.141 | 0 |
| 49 | | 3.0 | 0 | −.253 | 0 |
| 50 | | −3.0 | 0 | −.293 | 0 |
| 51 | | −1.0 | 0 | −.143 | 0 |
| 52 | | 3.0 | 0 | −.075 | 0 |
| 53 | | −1.0 | 0 | −.072 | 0 |
| 54 | | −3.0 | 0 | .481 | 0 |
| 55 | | 1.0 | 0 | −.186 | 0 |
| 56 | | −3.0 | 0 | −.055 | 0 |
| 57 | | 1.0 | 0 | .240 | 0 |
| 58 | | 3.0 | 0 | −.220 | 0 |
| 59 | | −3.0 | 0 | .351 | 0 |
| 60 | | 1.0 | 0 | −.048 | 0 |
| 61 | | 1.0 | 0 | .563 | 0 |
| 62 | | 3.0 | 0 | −.021 | 0 |
| 63 | | 3.0 | 0 | .468 | 0 |

It is to be expressly understood that the claimed invention is not to be limited to the description of the preferred embodiment but encompasses other modifications and alterations within the scope and spirit of the inventive concept.

I claim:

1. A system for the transmission of an initial data block in a television signal, said system comprising:
   (a) first conversion means for converting said initial data block to a transformed data block by applying an orthogonal frequency division multiplexing technique to said initial data block;
   (b) means for inserting said transformed data block into a horizontal line structure of said television signal;
   (c) means for extracting said transformed data block from said horizontal line structure of said television signal; and
   (d) second conversion means for converting said transformed data block back to said initial data block by applying an inverse transform of said orthogonal frequency division multiplexing technique to said transformed data block.

2. The system of claim 1, wherein said first conversion means uses a fourier transform to convert said initial data block to said transformed data block.

3. A system for transmitting an initial data block over a television channel, said system comprising:
   (a) first conversion means located at a transmitting end of said television channel for converting said initial data block to a transformed data block by applying an orthogonal frequency division multiplexing technique to said initial data block;
   (b) means for inserting said transformed data block into a vertical blanking interval of a television signal to be transmitted over said television channel;
   (c) data extraction means located at a receiving end for extracting said transformed data block from said vertical blanking interval of said television signal; and
   (d) second conversion means for converting said transformed data block to said initial data block by applying an inverse transform of said orthogonal frequency division multiplexing technique to said transformed data block.

4. The system of claim 3, wherein said first conversion means uses a discrete fourier transform to convert said initial data block to said transformed data block.

5. The system of claim 4, wherein said second conversion means uses the inverse of said discrete fourier transform to convert said transformed data block to said initial data block.

6. The system of claim 3, wherein said data extraction means employs a clock signal synchronized with a chroma burst signal of a television receiver located at said receiving end which receives said television signal.

7. The system of claim 3, including means for generating a guard interval by prepending a slice of data copied from one end of said transformed data block to an opposite end of said transformed data block.

8. The system of claim 7, wherein the length of said guard interval is determined by the transmission characteristics of said television channel.

9. The system of claim 3, wherein said data block is inserted into the active picture.

10. The system of claim 3, further including:
    (a) error coding means for applying an error detecting/correcting code to said initial data block before transmission thereof; and
    (b) means for employing said error detecting/correcting code to detect and correct errors in said initial data block which has been converted by said second conversion means.

11. The system of claim 10, wherein said error coding means uses an error coding scheme selected from the group consisting of Reed-Solomon coding, Hamming coding, and convolutional coding.

12. A system for transmitting an initial data block over a television channel, said system comprising:
    (a) means for inserting orthogonally transformed frequency multiplexed data into a vertical blanking interval of a television signal for transmission over said television channel;
    (b) means located at a receiving end of said television channel for extracting said transformed data from said vertical blanking interval of said television signal; and
    (c) second conversion means for converting said transformed data to said initial data block by inversely transforming said orthogonally transformed frequency multiplexed data.

13. A system for transmitting an initial data block over a television channel, said system comprising:
    (a) first conversion means located at a transmitting end of said television channel for converting said initial data block to a transformed data block by applying an orthogonal frequency division multiplexing technique to said initial data block;

(b) means for generating a guard interval by prepending a slice of data copied from one end of said transformed data block to an opposite end of said transformed data block;

(c) means for inserting said guard interval and said transformed data block into a vertical blanking interval of a television signal to be transmitted over said television channel;

(d) means located at a receiving end of said television channel for extracting said transformed data block from said vertical blanking interval of said television signal;

(e) second conversion means for converting said transformed data block to said initial data block by applying an inverse transform of said orthogonal frequency division multiplexing technique to said transformed data block; and (f) means for utilizing said guard interval to eliminate the effects of multipath interference from said television signal.

14. The system of claim 13, wherein said first conversion means uses a discrete fourier transform to convert said initial data block to said transformed data block.

15. A system for recording an initial data block in the horizontal line structure of a television signal, said system comprising:

(a) first conversion means for converting said initial data block to a transformed data block by applying an orthogonal frequency division multiplexing technique to said initial data block;

(b) means for storing said transformed data block into a horizontal line structure of said television signal;

(c) recording means for storing said television signal;

(d) means for extracting said transformed data block from said horizontal line structure of said television signal stored in said recording means; and (e) second conversion means for converting said transformed data block to said initial data block by applying an inverse transform of said orthogonal frequency division multiplexing technique to said transformed data block.

16. A method for transmitting an initial data block over a television channel, said method comprising the steps of:

(a) converting said initial data block to a transformed data block by applying an orthogonal frequency division multiplexing technique to said initial data block;

(b) inserting said transformed data block into a horizontal line structure of a television signal to be transmitted over said television channel;

(c) extracting said transformed data block from said horizontal line structure of said television signal; and (d) converting said transformed data block to said initial data block by applying an inverse transform of said orthogonal frequency division multiplexing technique to said transformed data block.

17. The method of claim 16, wherein said horizontal line structure is a vertical blanking interval.

18. The method of claim 16, including the step of prepending to said transformed data block a guard interval comprising a slice of data from an end of said transformed data block.

19. The method of claim 16, wherein said first converting step includes using a discrete fourier transform to convert said initial data block to said transformed data block.

20. The method of claim 16, wherein said step of extracting is synchronized with a chroma burst signal of a television receiver which receives said television signal.

21. A method for recording an initial data block in the horizontal line structure of a television signal, said method comprising the steps of:

(a) converting said initial data block to a transformed data block by applying an orthogonal frequency division multiplexing technique to said initial data block;

(b) storing said transformed data block into a horizontal line structure of said television signal; and (c) recording said television signal.

* * * * *

UNITED STATES PATENT AND TRADEMARK OFFICE
CERTIFICATE OF CORRECTION

PATENT NO. : 5,371,548

DATED : December 6, 1994

INVENTOR(S) : Thomas H. Williams

It is certified that error appears in the above-identified patent and that said Letters Patent is hereby corrected as shown below:

Column 1, line 57, delete "carder" and substitute --carrier--;

Column 2, line 23, delete "Performed" and substitute --performed--;

Column 5, line 55, delete "j= $\sqrt{-1}$" and substitute --j= $\sqrt{-1}$--;

Column 9, line 51, delete "fast-" and substitute --fast--;

Column 9, line 52, delete "=Fourier" and substitute --Fourier--;

Column 12, line 15, delete "64:)0" and substitute --600--;

Column 15, line 6, Table 1 sample number 22, third column, delete "1.0" and substitute -- -1.0--;

Substitute FIG. 2 on Sheet 2 of 7 with the attached FIG. 2;

Substitue FIG. 3 on Sheet 3 of 7 with the attached FIG. 3.

Signed and Sealed this

Fifth Day of September, 1995

*Attest:*

BRUCE LEHMAN

*Attesting Officer*   *Commissioner of Patents and Trademarks*

FIG. 3